June 8, 1943. G. R. WORNER 2,320,993
THERMOMETER CONSTRUCTION
Filed Jan. 31, 1941
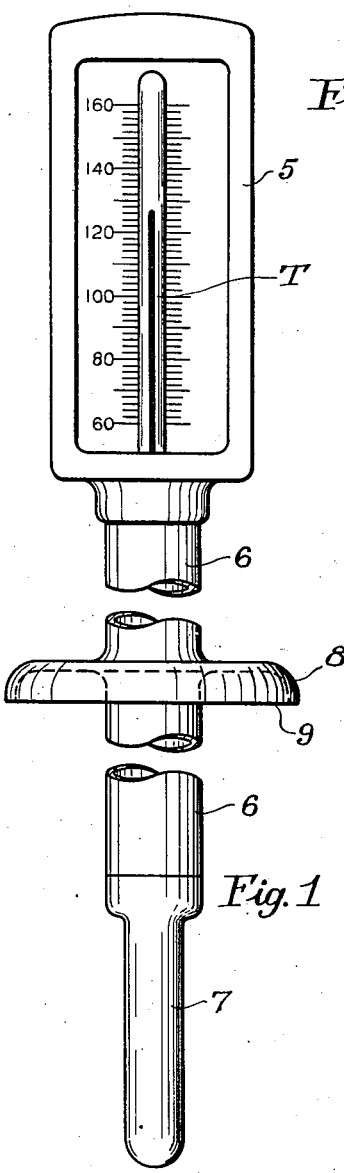
Fig. 1
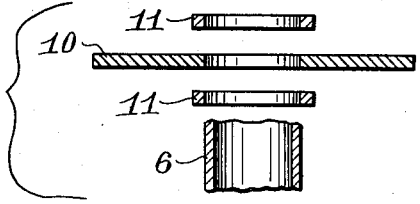
Fig. 2
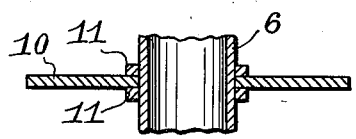
Fig. 3
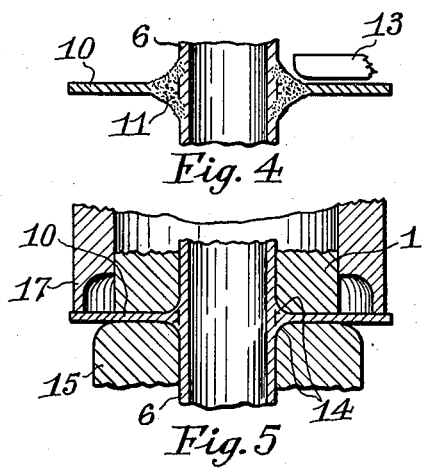
Fig. 4
Fig. 5
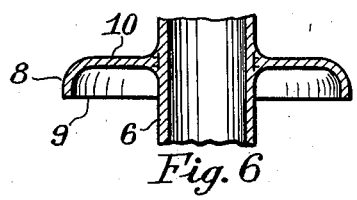
Fig. 6
Fig. 7
INVENTOR.
GEORGE R. WORNER
BY
ATTORNEY.

Patented June 8, 1943

2,320,993

UNITED STATES PATENT OFFICE 2,320,993

THERMOMETER CONSTRUCTION

George R. Worner, Rochester, N. Y., assignor to Taylor Instrument Companies, Rochester, N. Y., a corporation of New York Application January 31, 1941, Serial No. 376,791

2 Claims. (Cl. 29—148.2)

This invention relates to the method of providing an umbrella type flange fitting on the stem of a recording or indicating thermometer.

In order to record or indicate the temperature within a milk vat by means of a removable thermometer extending through the cover, it is necessary to provide a special umbrella fitting fixed to or integral with the thermometer stem to prevent condensate which might gather on the exposed portion of the stem or instrument from running down the stem into the vat. This fitting also supports the thermometer stem on the vat cover so that the bulb portion at the lower extremity of the stem is located at the proper level within the vat.

In the past, such fittings have been made from a block of metal formed into an umbrella-shaped annulus by means of a machine or lathe.

The annulus thus made was assembled at the desired point on the stem of thermometer, at which point the annulus was welded to the stem by fusing the metal of the filler rod of an arc welder to these elements. The extreme heat required to fuse the filler rod and to fuse it to the stem and annulus tended to warp and discolor these parts. Also the fused drops of filler rod metal collected at the weld to form a rough surface that was difficult to grind smooth.

In accordance with the present invention, the fitting is stamped from sheet metal thereby obviating the more expensive lathe work. Also the use of filler rod may be avoided in the welding operation and instead, there are used filler rings which do not need to be completely fused but only fused at joint surfaces.

It is an object of this invention to provide an improved method of making an umbrella fitting on a metal thermometer stem.

It is another object of the invention to provide an improved umbrella fitting and thermometer stem.

For an understanding of the invention, reference is made to the drawing in which:

Figure 1 is a face view of a thermometer made in accordance with the present invention;

Figure 2 is an exploded view of several related elements used in making the thermometer stem illustrated in Figure 1;

Figure 3 is a sectional view illustrating the first step in forming the improved fitting on a thermometer stem;

Figure 4 is a sectional view illustrating the elements of Figure 3 after the welding step;

Figure 5 is a sectional view similar to Figure 4 after the welded joints have been ground and polished and also showing one manner of shaping the flange or disk into a form approximating that of an umbrella;

Figure 6 is a sectional view through the thermometer stem after it has been shaped by the dies illustrated in Figure 5; and Figure 7 is a sectional view of a disk which may be used in a slightly modified form of the invention.

In Figure 1, there is illustrated a thermometer assembly including a case 5 having connected thereto a hollow metal stem 6 which terminates in an integral metal bulb 7 serving to protect therein the glass thermometer T, in the well-known manner. An umbrella-shaped flange fitting 8 is integrally secured on the stem 6. While the stem 6 and bulb portion 7 may be made of any non-corrosive metal, it is preferred to make these parts of a chrome-nickel-iron alloy (commonly known as 18–8 metal) especially when the thermometer is to be used in connection with the processing of milk. While a glass type indicating thermometer has been illustrated in Figure 1, it is to be understood that the stem 6 and bulb portion 7 may form a part of a recording instrument wherein a fluid-filled tube system is used instead of a glass thermometer.

The thermometer assembly illustrated in Figure 1 is adapted to be mounted on a milk vat by inserting the bulb 7 and stem 6 through a special vat fitting fixed in the cover of the vat (not shown). The vat fitting (likewise not shown) mates with the undersurface of the flange or fitting 8 provided on the stem 6. The fitting 8 is integrally joined to the stem 6 in a manner to be described being joined at a pre-determined distance from the bulb portion 7 so that the bulb portion will be located at a desired level within the vat. This fitting is shaped somewhat like an umbrella whereby condensate, which might accumulate on the stem or on the case above the flange, will drip from the free edge 9 of the flange to the vat-cover and thus be prevented from draining into the vat.

This invention relates particularly to the method of providing the umbrella flange or fitting 8 on the stem 6 which method has been illustrated in successive steps in Figures 2 and 6 inclusive.

In Figure 2, there has been illustrated, in position for assembly, a fragment of the mentioned chrome-nickel-iron stem 6, as well as a disk 10 and filler rings 11 of like material. These rings may be generally rectangular in cross section (Figure 2). The holes through the disk 10 and rings 11 are of a size to closely fit on the stem 6, as shown particularly in Figure 3 where these parts have been assembled on the stem at the point where it is desired to form the flange 8. Instead of utilizing separate filler rings as illustrated in Figures 2 and 3, there may be used a disk 10' provided with integral filler rings 11' forming a hub portion of the configuration shown in Figure 7.

Either the disk 10 or disk 10' is next welded to the stem preferably by means of an atomic-hydrogen arc. This arc fuses at least a part of each of the rings 11 to the adjacent metal of the disk 10 and stem 6 as shown in Figure 4. In the case of the disk 10' at least a portion of each of the rings 11' forming the hub is fused to the stem 6 providing a product similar to that shown in Figure 4.

The welded joint is then machined in a lathe by means of a suitable tool such as shown at 13 or it can be ground, and finally polished to form smooth rounded fillets, as indicated at 14 in Figure 5. It will be understood that since the disk 10 is flat it is a relatively simple matter to machine or grind away the rough metal at the weld and grind and polish the fillet 14, whereas it would be difficult and expensive to finish the joint on the underside of the disk if it were necessary to perform the finishing operations on the disk while in its umbrella-shaped form.

After the welded joint has been finished in the manner described above, the stem is inserted between the punch 15 and holder 16 as shown in Figure 5. A suitable die 17 shapes the disk into its final form illustrated in Figure 6. In the event that the disk 10 has been warped by the welding operation, the mentioned die elements which shape the disk will also straighten or true it.

When the disk has been shaped by the die, the stem and disk may be given a final polishing operation to remove any surface marks which may result from the die-forming operation.

It has been found that by using filler rings such as 11 or 11' which may be only partly fused to the stem 6 and disk 10 or to the stem only in the case of the disk 10' by means of an atomic-hydrogen arc, considerably less localized heat is applied to the disk and stem than in the case where a filler or welding rod of an arc welder is used to deposit metal and weld the disk to the stem. By having this localized heat at a minimum, the tendency of the disk to warp and discolor is materially decreased or avoided. It is, therefore, possible and it is within the purview of this invention, to stamp or form the disk 10 or the disk 10' into umbrella shape before assembling it on the stem 6. Further, since a much smoother welded joint results from the use of preformed filler rings and an atomic-hydrogen arc, the grinding or machining away of the rough metal is a much simpler task than with the conventional arc welded joint formed by depositing metal from a filler or welding rod. Consequently, the smoothing of the fused filler rings to rounded fillet form is relatively simple even though the disk may be of umbrella shape before assembling it on the stem.

I claim:

1. The method of manufacturing a sanitary hollow thermometer stem with an integral flange fitting all made of a noncorrosive ferrous alloy which method comprises providing an annulus of said alloy having an opening therethrough of a diameter slightly larger than that of said stem, providing border rings of said alloy at each surface of said annulus at the opening therethrough, the openings through said border rings being approximately the same size as the opening through said annulus, assembling said annulus with said border rings on said stem, fusing said rings to fill the junction between said stem and said annulus, shaping the fused rings to provide rounded fillets at said junction, and then simultaneously correcting any distortion in said annulus and curving it into an umbrella shape by forming it in a cooperating punch and die.

2. The method of manufacturing a sanitary hollow protective thermometer stem with an integral flange fitting all made of a non-corrosive ferrous alloy, which comprises providing an annulus of said alloy having a flat periphery and having the opening therethrough of a diameter slightly larger than that of said stem, inserting the stem through the annulus, applying an excess of the fused alloy respectively joining each surface of the annulus to the stem to close and render seamless the joint between said stem and said annulus, shaping the applied alloy at each mentioned surface by removing a portion thereof to provide fillets of concave cross-section smoothly merging with said stem and said annulus, and then simultaneously correcting any distortion in said annulus and curving the periphery thereof into an umbrella shape by forming the annulus in a cooperating punch and die.

GEORGE R. WORNER.